Patented Oct. 11, 1938

2,132,423

UNITED STATES PATENT OFFICE 2,132,423

PELLET LITHARGE

Louis G. Klinker, Hammond, Ind., assignor to The Glidden Company, Cleveland, Ohio, a corporation of Ohio No Drawing. Application February 11, 1937, Serial No. 125,302

7 Claims. (Cl. 23—245)

This invention relates to litharge, and has particular reference to a new and novel form of litharge, characterized by the fact that it comprises hard pellets of substantially non-dusting material which will flow by gravity through a pipe or spout without adhering to it, while at the same time preserving substantially the reactivity of the powdered litharge.

Litharge is a product much used in the art. It is an important raw material of the paint industry, of the ceramic industry, of the lead storage battery industry, and in the chemical industries generally. The product has always been marketed as a very fine powder which has certain inherent objections. This powder is dusty, and continued work with it may result in lead poisoning. It has a tendency to adhere to containers, and this is especially marked when the litharge is being fed by gravity through pipe lines and chutes, when stoppage of flow may easily occur due to this adhesion.

Attempts have been made to briquette the product in the past, but with little success. The litharge, without a binder, or merely wet with water, has insufficient cohesion, even when briquetted under pressure, to produce hard non-dusting pellets unless unusually high pressures are used. In such cases, where pressures of the order of 10 tons per square inch are used, hard pellets are produced; but the structure of the powdered litharge is changed into a flake form, which is extremely difficult to react. Furthermore, the color changes from the conventional yellow color of litharge to a brown, which is very objectionable. When conventional binders are used, a relatively large percentage of binder is required (0.5 to 1.0% and more) as the adhesive has relatively poor action on the litharge. Such substantial percentages of glue, starch and the like are definite adulterants for most uses of litharge, and somewhat retard chemical action.

Glycerine has been suggested as an adhesive agent, inasmuch as it forms the well-known litharge glycerine cement; but it discolors the litharge to such an extent that its use is objectionable. Furthermore, this glycerol remains behind as an impurity.

I have discovered that litharge can be briquetted by binding it with a solution of basic lead acetate, preferably formed in the litharge by the action of acetic acid; that the resultant paste can be formed into pellets with little or no pressure beyond a simple shaping; and that the pellets can be dried and finally ignited to expel the acetic acid, the resultant pellets of pure litharge remaining hard, firm and substantially non-dusting. By this method, a litharge pellet free of impurities can be made for the first time, which at the same time retains substantially the chemical activity of the powder.

Various percentages of basic lead acetate may be used; but the adhesiveness increases with increasing amounts up to a quantity corresponding to 0.5% acetic acid, based on the total lead oxide content. Beyond this, no improvement in properties is noted; and the introduction of higher percentages is merely additional expense, while more acetic acid remains to be driven off. I have, however, used amounts up to 1% of acetic acid with good results.

As indicated, I prefer to use acetic acid and form the basic acetate in situ, as this makes for a more even distribution of the binder. I likewise prefer to use a dilute aqueous solution—say a 10% solution—of acid to insure more complete mixing.

I have made pellets by spraying 10% acetic acid solution on ordinary ground litharge, on a revolving table, controlling the pellets particle size by the fineness of spray and speed of revolution. Better results are obtainable, however, by mixing the dilute acid and the litharge to a very stiff paste in a pug mill, and extruded from small openings in a sausage grinder, the extruding material being chopped off automatically by reciprocating knives or merely allowed to break off by gravity. The pellets can be made substantially spherical by being allowed to fall on a revolving table.

The resultant spherical or cylindrical pellets are allowed to air dry, whereby they harden into pellets of substantially non-dusting material in a few hours. These pellets, containing lead acetate, may be heated in a furnace at about 300° C. to decompose the lead acetate, and drive off the acetic acid, to give substantially pure litharge pellets, bright yellow in color, free-flowing, substantially non-dusting and substantially as reactive as the powder.

The resulting pellets may be rendered completely dustless by tumbling with a very minor percentage of light lubricating oil. Amounts of about 0.1–0.2% oil will thoroughly coat the pellets, and permit slippage, without leaving a film which is greasy to the touch.

The pellets may, of course, be varied in size considerably; but I prefer to have their dimensions of the order of .05–.15 inch, so that each particle will have a substantial individual size, while remaining small enough to enter easily into chemical reactions.

I claim:

1. A substantially non-dusting pellet of particles of substantially pure litharge bonded together by basic lead acetate.

2. The pellet of claim 1 in which the quantity of basic lead acetate corresponds to not more than 0.5% acetic acid based on the total lead oxide content.

3. The method of making litharge pellets which comprises forming a paste of litharge and an aqueous solution of basic lead acetate into pellets, and drying.

4. The method of making litharge pellets substantially free of impurities which comprises forming a paste of litharge and an aqueous solution of basic lead acetate into pellets, drying and heating to decompose the lead acetate, and volatilize the acetic acid.

5. The method of making litharge pellets which comprises adding acetic acid to litharge to form a paste, forming pellets therefrom, and drying.

6. The method of making litharge pellets which comprises adding aqueous acetic acid to litharge to form a paste, forming pellets therefrom, and drying and heating to decompose the lead acetate and volatilize the acetic acid.

7. The method of making litharge pellets which comprises adding aqueous acetic acid to litharge to form a paste, forming pellets therefrom, and drying and heating to decompose the lead acetate and volatilize the acetic acid and thereafter coating the particles with a thin film of lubricating oil.

LOUIS G. KLINKER.